United States Patent [19]

Durham

[11] Patent Number: 4,552,318
[45] Date of Patent: Nov. 12, 1985

[54] FISH STRIKE INDICATOR

[76] Inventor: B. Elwood Durham, Southern Ave., Kannapolis, N.C. 28081

[21] Appl. No.: 517,266

[22] Filed: Jul. 26, 1983

[51] Int. Cl.⁴ ............................................. A01K 89/01
[52] U.S. Cl. .................................... 242/84.1 K; 43/17
[58] Field of Search ..................... 242/84.1 K, 84.1 R, 242/148, 147 R, 84.2 A, 84.21 A, 84.2 R, 84.2 D; 43/17; 116/215, 307

[56] References Cited

U.S. PATENT DOCUMENTS

| 2,561,935 | 7/1951 | McCash | 242/84.2 D |
| 3,023,532 | 3/1962 | Gorenty | 43/17 |
| 3,498,562 | 3/1970 | Johnson | 242/84.2 A |
| 3,516,191 | 6/1970 | Baenziger | 242/84.1 K |

FOREIGN PATENT DOCUMENTS 2021372 12/1979 United Kingdom ..................... 43/17

Primary Examiner—Billy S. Taylor
Attorney, Agent, or Firm—Bernard, Rothwell & Brown

[57] ABSTRACT

A closed face fishing reel is modified or initially formed to provide a seat adjacent the opening through which the fishing line passes. The seat may be formed as a separate member attachable in any suitable manner to the face of the reel or the reel body itself may be formed during manufacture to provide a seat of the proper size and position. An annular member, which is employed as a strike indicator, is made of such size as to be frictionally received on the seat for convenient storage when not in use. Further, it is made so as to be easily removable from the seat when it is desired to place the annular member in a strike-indicating position for use. When it is desired to utilize the strike indicator, it is simply removed from its position in engagement with the seat and allowed to fall by its own weight to a position in slack in the line. It is thus clearly visible when the fishing rod is positioned, as it is normally expected to be when in use, in a supported inclined position. A strike by a fish causes movement of the line which varies the slack in the line and thereby imparts an up and down movement to the indicator, signalling a strike to the user.

10 Claims, 4 Drawing Figures

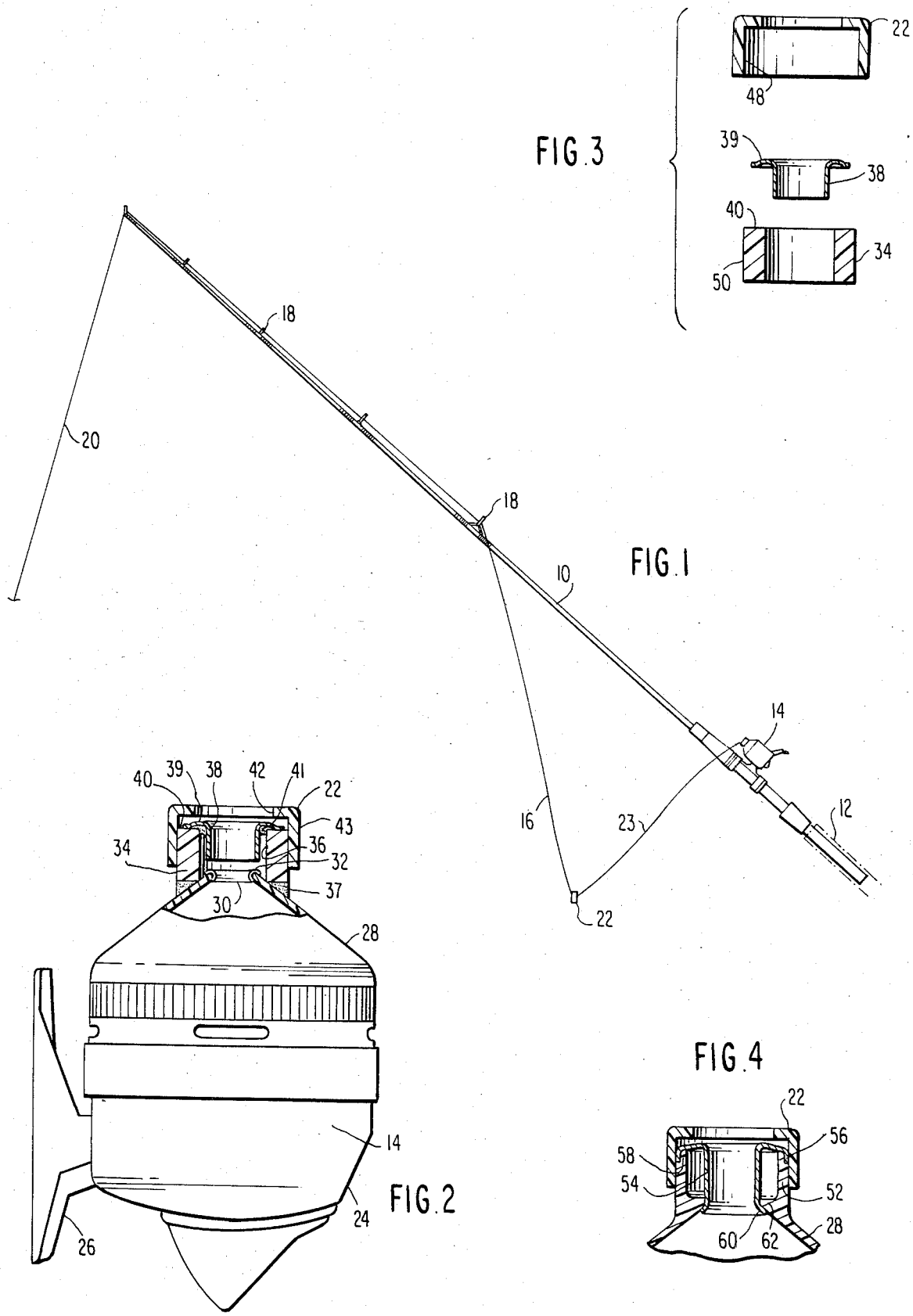

FISH STRIKE INDICATOR

BACKGROUND OF THE INVENTION

1. Field of The Invention

This invention relates to a device useful in bottom fishing for indicating a strike or other contact by a fish with the fishing line and, more particularly, it relates to such an indicator especially suitable for use with closed face reels.

2. Description of The Prior Art

Many prior art fishing devices for indicating the presence of a fish at the bait utilize corks, floats, bobbers, etc., which float on the water. Such devices depend on being pulled downwardly against the buoyancy of the water to give an indication of a strike by a fish. Particularly where the water is choppy, it is difficult to detect the movement of the float or bobber caused by a fish biting or striking the line and to distinguish this movement from the up and down movement caused by the choppy water itself. The device of the present invention works as well with choppy water as with calm water. Also, the entire device is visible and not merely a part of the device as in the case of a float or bobber. Further, movement of the device is easily visible even in dim light.

In addition to devices which float on water, the prior art discloses various devices for indicating a bite or strike which are mounted on a rod and supported in the air so that movement of some object as a result of a bite or strike is visible. However, such prior art devices of this type have been relatively cumbersome and complex and have therefore been unduly expensive or difficult to adapt to standard fishing equipment.

By the present invention, there is provided a fish strike indicator which effectively signals a nibble, bite or strike by a fish, which is simple and inexpensive, and which is easily adapted to essentially all closed face reels without any modification of the reel itself. Further, it is simple to make and to install, may be supported on the reel in a convenient and accessible location when not in use so that it is immediately available and does not have to be stored in a tackle box or other such equipment where it might become lost and, in any event, is not immediately and conveniently accessible to the fisherman. When in use, the device is supported by the line, without any accessory equipment being required. The indicator of this invention may be utilized by modifying existing closed face reels to incorporate the indicator or, alternatively, it may be incorporated as a feature with newly-manufactured closed face reels.

Accordingly, it is an object of this invention to provide a fish strike indicator which is simple in construction, easily adapted for use with and easily installed on standard closed face reels, and which indicates a fish nibble, bite or strike even in dim light.

It is another object of this device to provide a fish strike indicator which is conveniently located on the reel when the indicator is not in use without interfering with the normal use of the reel and which can easily be moved from the stored position to the "in use" position when desired.

It is a further object of this invention to provide a fish strike indicator which is stored on the reel itself when not in use so that it is immediately accessible for use and does not become lost or require time to find, as would be the case if it were stored elsewhere, for example, in a tackle box.

It is a further object of this invention to provide a fish strike indicator which adds no significant weight to the reel.

It is a further object of this invention to provide a fish strike indicator which is supported entirely by the fishing line when in use and which requires no additional accessories for supporting it from the fishing rod.

SUMMARY OF THE INVENTION

In carrying out the invention, in one form thereof, a closed face fishing reel is modified or initially formed to provide a seat adjacent the opening through which the fishing line passes. The seat may be formed as a separate member attachable in any suitable manner to the face of the reel or the reel body itself may be formed during manufacture to provide a seat of the proper size and position. An annular member, which is employed as a strike indicator, is made of such size as to be frictionally received on the seat for convenient storage when not in use. Further, it is made so as to be easily removable from the seat when it is desired to place the annular member in a strike indicating position for use. When it is desired to utilize the strike indicator, it is simply removed from its position in engagement with the seat and allowed to fall by its own weight to a position in slack in the line. It is thus clearly visible when the fishing rod is positioned, as it is normally expected to be when in use, in a supported inclined position. A strike by a fish causes movement of the line which varies the slack in the line and thereby imparts an up and down movement to the indicator, signalling a strike to the user.

BRIEF DESCRIPTION OF THE DRAWINGS

For a better understanding of the invention, reference may be had to the accompanying drawing in which:

FIG. 1 is a view of a standard fishing rod including a closed face reel and incorporating an embodiment of this invention;

FIG. 2 is an enlarged view, partly in section, of the closed face reel shown in FIG. 1 incorporating an embodiment of this invention wherein the invention is applied to an existing reel;

FIG. 3 is an exploded view showing components of the device of this embodiment of the invention; and FIG. 4 is a sectional view of the front portion of a closed face reel in which the reel itself is formed during manufacture to support the fish strike indicator of this invention.

DESCRIPTION OF THE PREFERRED EMBODIMENT

Referring now to FIG. 1 there is shown a fishing rod 10. The rod is shown in FIG. 1 in the position in which it would normally be employed for fishing utilizing the strike indicator of this invention. Specifically, the rod is positioned, as illustrated, in a position inclined between the horizontal and the vertical. The rod may be easily held in this position by placing the end thereof in a socket or rod holder 12 in a conventional manner. Only a portion of the socket 12 is shown in FIG. 1. The remainder, in normal use, would be anchored in the ground adjacent the body of water being fished.

The fishing rod 10 includes a conventional construction including a closed face reel 14 mounted in the usual manner on the rear portion of the fishing rod. The fishing line 16 may be reeled onto a spool of the closed face reel as desired and it may be unreeled therefrom as desired. Also in a conventional manner, the rod includes a plurality of spaced eyelets 18 mounted thereon through which the line 16 extends. It will be understood that a suitable hook and bait or other fish attracting device (not shown) will be placed on the end of the line extending into the water from the portion shown at 20. The fish strike indicator 22 of this invention is shown in its "in use" position suspended in a slack portion 23 of the line 16.

The invention as described in this application is employed with a closed face reel which may be of any conventional type generally shown at 14 in FIG. 2. The reel includes a conventional two-part body, including a rear portion 24 having an integral foot 26 for mounting the reel on the fishing rod, and a front or closed face portion 28 which is assembled to the rear portion 24. Internally the reel includes a conventional spool (not shown) upon which the fishing line may be wound. The internal construction of the fishing reel is conventional and, since such construction is well known to those skilled in the art and is not part of the present invention, it is not being illustrated or described.

As shown in FIG. 2 the reel 14 includes at its front face or nose an opening 30 through which the fishing line passes. The reel housing itself is conventionally made of plastic but also conventionally a metal grommet 32 is received within the opening 30 and the fishing line actually extends through this grommet in a conventional reel. The grommet 32 provides a smooth surface over which the fishing line passes and also provides long wear.

The device of this invention may be provided in a form suitable for easy assembly on existing reels or it may be provided with newly-manufactured reels which incorporate a modified nose structure. In accordance with this invention, as applied to existing reels, the front face of the closed face reel is modified to provide a convenient storage position for the fish strike indicator of this invention. The term "strike" is being used in this specification, including the claims, to cover all types of contact of a fish with the line, referred to by various terms such as nibble, bite, strike, etc. In the embodiment shown in FIG. 2, the reel 14 has been modified to incorporate at the front face thereof adjacent the opening 30, a tubular member 34 having an internal diameter 36 somewhat larger than that of the grommet 32. In the preferred embodiment the tubular member 34 is formed of a plastic material, for example, plastic of the same type as that employed in making the housing of the reel, and is secured to the front face of the reel in any suitable manner. For example, it may be secured thereto by an epoxy or other adhesive material, as indicated at 37. Thus, as modified, the reel includes a tubular extension from the front or closed face portion 28 thereof.

Mounted on the outer end of the tubular member 34 and secured thereto in any suitable manner, for example by an epoxy or other adhesive material, is a metal eyelet 38. The internal diameter of the eyelet 38 is approximately the same as that of the grommet 32 and the fishing line 16 passes through this eyelet 38. The eyelet 38 includes a flange 39 extending along the front face 40 of the tubular member 34. The eyelet 38 is secured to the member 34 at the flange 39 in any suitable manner, for example by means of an epoxy or other adhesive, as indicated at 41.

The tubular member 34 has been illustrated and described as a separate component which is mounted by means of a suitable adhesive on the face of an existing reel, and it is contemplated that it will be so made in many cases so that the device of this invention may be sold as a kit which any user may easily mount on his existing closed face fishing reel. It will be apparent, however, as described later in connection with FIG. 4, that, if desired, the reel housing could be initially manufactured so as to support the fish strike indicator.

As shown in FIG. 2, the indicator 22 itself comprises an annular member of somewhat U-shaped cross section having an opening 42 in the face thereof and a rearwardly extending annular flange 43. The flange 43 has an inner diameter substantially the same as the outer diameter of the tubular member 34 so as to seat on the member 34. In the preferred embodiment of this invention the member 22 is formed of a suitable plastic and of such shape and size as to have a firm frictional fit with the tubular member 34 in its stored position on the reel 14, but is easily removable for use as an indicator in the position shown in FIG. 1.

Applicant's fish strike indicator is illustrated in more detail in the exploded view of FIG. 3. As there shown, the component 34 which is to be attached to the front face of the closed face reel 14 is a tubular member which may be made of a suitable plastic for easy assembly on the front face portion 28 of the reel by means of an epoxy or other suitable adhesive. The eyelet 38, through which the fishing line extends, is preferably made of metal for wear characteristics as the fishing line rides thereover during use. The eyelet includes a flange 39 adapted to bear against the front face 40 of the member 34 and to be secured thereto by any suitable adhesive, as shown in FIG. 2. The third component is the indicator itself which is an annular member made of any suitable plastic. The indicator 22 has an inner diameter 48 which corresponds very closely to the outer diameter 50 of the member 34 so that, when not in use, the annular member 22 may be pressed onto the member 34 with a friction fit so as to be retained firmly thereon. The indicator is thus stored conveniently with the reel itself so as to be immediately available for use. Moreover, it can be removed from the stored position easily by simply exerting a forward pull thereon. When the indicator has been removed from its assembled position on the reel, the user simply pulls off about one arm's length of the line and then allows the indicator to fall toward the water so as to assume the position shown in FIG. 1 where the indicator 22 is held in the air in the slack of the line. The indicator 22 may be made of any suitable material but it is preferably made of white plastic so as to be easily visible even in dim light.

It is apparent from the above description that the components shown in the exploded view of FIG. 3 which comprise the applicant's fish strike indicator may be provided as a kit for sale to prospective users, each of whom can assemble the fish strike indicator on his own closed face reel in a matter of a few minutes, using readily available adhesive materials or adhesive material provided with the kit itself.

While the components of the applicant's fish strike indicator have been shown and described above as including a metal eyelet 38, and it is presently preferred to include this eyelet, the eyelet could be omitted, if desired, and the aforementioned kit could comprise the tubular member 34 and the indicator 22 mountable thereon. In this case, the tubular member 34 would be made somewhat shorter than shown in FIG. 2 and the indicator in its stored position would abut the front end of the tubular member 34.

It is also apparent that while it is contemplated that applicant's fish strike indicator will be made available in the form of a kit, as described above, so as to be marketable at relatively low cost to those desiring to convert their existing reels, the invention is also applicable as an additional feature to new reels being manufactured. When the invention is utilized with new reels being manufactured, the front portion 28 of the reel housing would simply be modified so as to include a forwardly extending tubular portion corresponding to the member 34. This forward extension need only be of sufficient length to accommodate the gripping flange 43 of the annular member 22.

One suitable form of modified reel structure is shown in FIG. 4. As there illustrated, the front portion 28 of the reel has been modified to include a forwardly extending tubular extension 52, corresponding to the tubular member 34 of the form of invention shown in FIG. 2. To provide a suitable guide for the fishing line 16, a metal eyelet 54 of appropriate diameter is mounted on the tubular extension 52. The metal grommet 32 shown in FIG. 2 would be omitted. The eyelet 54 is formed to include a rearwardly extending flange 56 which is received in a shoulder 58 formed on the front end of the tubular extension 52. The rear end of the eyelet 54 is bent outwardly as shown at 60 to engage an annular projection 62 on the portion 28 of the reel. The indicator 22 engages the tubular extension 52 with a friction fit in the same manner as the indicator engages the tubular member 34 in the form of invention shown in FIGS. 2 and 3. As in the case of the form of invention shown in FIGS. 2 and 3, the eyelet 54, while preferred, could be omitted if desired, since the essence of the invention is the provision of a tubular member, or tubular extension, and a flanged indicator receivable with a friction fit on the tubular member. It will be apparent that the details of reel construction shown in FIG. 4 may be varied so long as the tubular member for receiving the indicator is retained.

When not in use, the indicator 22 is conveniently stored in its assembled position in frictional engagement with the member 34 in the embodiment shown in FIGS. 1-3, or with the tubular extension 52 in the embodiment of FIG. 4, as described above. It is therefore immediately at hand and readily available to the user when desired, and is not stored in a tackle box or other receptacle from which it must be obtained by the user and where it may become lost. In the utilization of the fish strike indicator of this invention, the user first casts the line to the desired position for bottom fishing. It will be noted that the indicator 22 which is then in its seated position on the tubular member 34, or on the tubular extension 52, does not interfere in any way with the normal cast. The user then mounts the fishing rod in the inclined position shown in FIG. 1, wherein it is supported, for example, by means of the socket or rod holder 12 into which the end of the fishing rod is placed. The socket 12 is supported in the ground or in any other suitable manner to maintain its inclined position. The user then simply removes the indicator 22 from its position on the member 34, pulls off about an arm's length of fishing line and releases the indicator. The indicator 22 falls by its own weight toward the water into the position shown in FIG. 1 where it hangs in the air at the bottom of the slack portion 23 of the fishing line and where it is clearly visible. Moreover, being supported in the air rather than in the water, there is no danger of the indicator becoming snagged on obstacles in the water.

When a fish strikes, the movement of the line as a result of the strike causes the indicator 22 to move up and down as the slack increases or decreases, and this movement is clearly visible to the fisherman even in dim light. In contrast to floats or bobbers which ride on the water, the indicator of this invention is not affected by whether the water is choppy or calm. Its movement is equally visible regardless of water conditions. Moreover, even in dim light, for example, at dusk or even at night, the white plastic indicator and its movement are clearly visible to the fisherman. Further, when the fish makes a really hard strike the movement of the line will cause the indicator to clap against the seat on the reel so that even a relatively inattentive fisherman will be made conscious of the strike by the resultant sound.

It will be apparent that with the device of this invention a fisherman may fish two or more lines at the same time, during the day or night, from a bank or pier and regardless of choppy or calm water. As a further matter of convenience, when the fisherman takes the rod out of its socket support and holds it in a normal position the indicator will fall naturally into an area where his hands are located and he has merely to press it back on its seat and he is then ready to cast again. After the cast, he places the end of the rod in the socket and at the same time with the other hand removes the indicator from its seat, pulls off about an arm's length of fishing line and allows the indicator to drop into the position shown in FIG. 1 in the slack of the line. He then merely has to wait for the indicator to visibly indicate a fish strike and then play the fish successfully.

The fish strike indicator of this invention can be applied to all conventional closed face reels without interference with the design or mechanism and without interfering in any way with the normal operation of the reel. Also, as described, it may be incorporated with newly-manufactured closed face reels with only minor modification of the front face of the reel. During casting the indicator 22 is retained on the seat of the tubular member so that it does not interfere in any way with the casting operation. The reel can be used in the same manner as if the indicator were not present. Moreover, when the fisherman desires to use the indicator it is immediately available on its seat, and the user does not have to search for it in a tackle box, nor run the risk that it may be lost or stepped on and broken or damaged. The indicator is always positioned with the fishing line running through it so that, as described above, it need merely be dropped into its indicating position and does not have to be assembled on the line for use. Finally, the indicator adds no significant weight to the reel, it being possible to incorporate an effective indicator with an additional weight of about $\frac{1}{4}$ ounce.

While particular embodiments of this invention have been shown and described, it is not intended that the invention be limited to the specific constructions shown and it is intended by the appended claims to cover such modifications as come within the spirit and scope of this invention.

It is claimed:

1. For use with a closed face fishing reel having a front face portion and including an opening for a fishing line in the front face portion, a fish strike indicator comprising:

(a) an annular indicating member adapted to be received on a fishing line with the line extending through the opening in said annular member, so that said annular member and line may move freely with respect to each other;
(b) a tubular member for removably supporting said annular indicating member, said tubular member being formed for attachment to said front face portion surrounding the opening in said front face portion;
(c) said annular indicating member being dimensioned to frictionally engage said tubular member when not in use;
(d) said annular indicating member being removable from said tubular member for use and being supported during such use in slack formed in the line;
(e) said annular indicating member being caused to move up and down when the line is moved by a striking fish to provide a visible indication of the strike.

2. The fish strike indicator as recited in claim 1 wherein:
(a) said tubular member has a predetermined outside diameter; and
(b) said annular indicating member includes a flange having an inside diameter approximately equal to the said outside diameter of said tubular member so as to seat on said tubular member with a friction fit when not in use but to be easily removable therefrom for use.

3. The fish strike indicator as recited in claim 2 wherein said tubular member includes a forward end and a metal eyelet is assembled on said forward end.

4. The fish strike indicator as recited in claim 2 wherein said annular indicating member is made of white plastic so as to be easily visible in use.

5. A closed face fishing reel having a front face portion and having an opening for a fishing line in the front face portion and including a fish strike indicator comprising:
(a) a tubular member secured to said front face portion of the reel surrounding the fishing line opening therein, said tubular member having a forward end;
(b) an annular indicating member seated on the forward end of said tubular member and frictionally engaging said tubular member, said annular member having an opening therein through which the fishing line extends;
(c) said annular indicating member being removable from said tubular member for use and being supported in use in a slack portion of the fishing line whereby a strike on the line causes visible up and down movement of said indicating member.

6. The reel as recited in claim 5 and further including adhesive disposed between said tubular member and said front face portion of the reel for supporting said tubular member on said front face portion.

7. The reel as recited in claim 5 wherein said indicating member is formed of white plastic so as to be clearly visible in use.

8. A closed face fishing reel having a front face portion and including a fish strike indicator comprising:
(a) said front face portion of said reel being formed to provide a tubular member, said tubular member having a forward end formed to provide a seat;
(b) an annular indicating member including a central opening and including a flange having an inside diameter substantially corresponding to the outside diameter of said forward end of said tubular member to provide a frictional fit with said seat so that said annular member is retained thereon when not in use;
(c) said reel including a fishing line extending through said central opening of said annular indicating member;
(d) said annular indicating member being easily removable from said seat for use and being supported in use by said line in slack formed in said line, whereby said indicator moves up and down when a fish strikes the line to give a visible indication of the strike.

9. The reel of claim 8 and further including:
(a) an eyelet providing a guide for said fishing line;
(b) said eyelet including a rearwardly extending flange; and
(c) said forward end of said tubular member including a shoulder at for receiving said flange of said eyelet to mount said eyelet.

10. The reel of claim 8 wherein said annular member is formed of a material having a color which enhances visibility.

* * * * *